US011492561B2

United States Patent
Park et al.

(10) Patent No.: US 11,492,561 B2
(45) Date of Patent: Nov. 8, 2022

(54) CATALYST PRECURSOR FOR HYDROCRACKING REACTION AND METHOD FOR HYDROCRACKING HEAVY OIL BY USING SAME

(71) Applicants: KOREA RESEARCH INSTITUTE OF CHEMICAL TECHNOLOGY, Daejeon (KR); Industry-Academic Cooperation Foundation Of Sunchon National University, Jeollanam-do (KR)

(72) Inventors: Sunyoung Park, Daejeon (KR); Chul Wee Lee, Daejeon (KR); Gyoo Tae Kim, Daejeon (KR); Hwi Min Seo, Daejeon (KR); Minehul Chung, Gwangju (KR); Seok Hwan Son, Jeollanam-do (KR); Byong Min Choi, Gwangju (KR)

(73) Assignees: KOREA RESEARCH INSTITUTE OF CHEMICAL TECHNOLOGY, Daejeon (KR); INDUSTRY-ACADEMIC COOPERATION FOUNDATION OF SUNCHON NATIONAL UNIVERSITY, Jeollanam-do (KR)

( * ) Notice: Subject to any disclaimer, the term of this patent is extended or adjusted under 35 U.S.C. 154(b) by 112 days.

(21) Appl. No.: 16/979,350

(22) PCT Filed: Jun. 27, 2019

(86) PCT No.: PCT/KR2019/007776
§ 371 (c)(1),
(2) Date: Sep. 9, 2020

(87) PCT Pub. No.: WO2020/017777
PCT Pub. Date: Jan. 23, 2020

(65) Prior Publication Data
US 2021/0002563 A1 Jan. 7, 2021

(30) Foreign Application Priority Data
Jul. 17, 2018 (KR) .................. 10-2018-0082925

(51) Int. Cl.
*C10G 47/06* (2006.01)
*B01J 27/051* (2006.01)
*B01J 37/04* (2006.01)
*B01J 37/20* (2006.01)
*C01G 39/06* (2006.01)
*C07F 11/00* (2006.01)

(52) U.S. Cl.
CPC ............ *C10G 47/06* (2013.01); *B01J 27/051* (2013.01); *B01J 37/04* (2013.01); *B01J 37/20* (2013.01); *C01G 39/06* (2013.01); *C07F 11/00* (2013.01); *C10G 2300/202* (2013.01); *C10G 2300/205* (2013.01); *C10G 2300/4006* (2013.01); *C10G 2300/4012* (2013.01); *C10G 2300/70* (2013.01)

(58) Field of Classification Search
CPC ......... C10G 47/00–36; C10G 49/00–26; B01J 27/051
See application file for complete search history.

(56) References Cited

U.S. PATENT DOCUMENTS

2005/0241991 A1* 11/2005 Lott .................... C10G 49/005
208/213
2013/0180886 A1* 7/2013 Simon .................... B01J 31/34
208/111.3

FOREIGN PATENT DOCUMENTS

| KR | 2010-0074025 A | 7/2010 |
| KR | 2011-0135022 A | 12/2011 |
| KR | 2012-0069959 A | 6/2012 |
| KR | 2012-0103235 A | 9/2012 |
| KR | 101555000 B1 | 9/2015 |

OTHER PUBLICATIONS

English machine translation of KR 10-2012-0069959, obtained from WIPO. (Year: 2012).*
International Search Report PCT/ISA/210 for International Application No. PCT/KR2019/007776 dated Oct. 2, 2019.

* cited by examiner

*Primary Examiner* — Renee Robinson
(74) *Attorney, Agent, or Firm* — Harness, Dickey & Pierce, P.L.C.

(57) ABSTRACT

The present invention relates to a catalyst precursor for forming a molybdenum disulfide catalyst through a reaction with sulfur in heavy oil and to a method for hydrocracking heavy oil by using same. According to the present invention, the yield of a low-boiling liquid product with a high economic value in the products by heavy oil cracking can be increased, and the yield of a relatively uneconomical gas product or coke (toluene insoluble component), which is a byproduct, can be significantly lowered.

11 Claims, No Drawings

CATALYST PRECURSOR FOR HYDROCRACKING REACTION AND METHOD FOR HYDROCRACKING HEAVY OIL BY USING SAME

CROSS-REFERENCE TO RELATED APPLICATIONS

This application is a national phase under 35 U.S.C. § 371 of PCT International Application No. PCT/KR2019/007776 which has an International filing date of Jun. 27, 2019, which claims priority to Korean Patent Application No. 10-2018-0082925, filed Jul. 17, 2018, the entire contents of each of which are hereby incorporated by reference.

TECHNICAL FIELD

The present invention relates to a catalyst precursor which reacts with sulfur in a heavy oil to form a molybdenum disulfide catalyst and a hydrocracking method of a heavy oil using the same.

BACKGROUND ART

In general, coke is prepared by carbonizing coking coal used in the steel industry. Here, a high-boiling point organic matter having a high carbon ratio is obtained, which is called coal tar, and in order to recycle produced coal tar, usually carbon black, naphthalene, pitch, and the like are produced by a pyrolysis process at a high temperature of 1200 K or higher. The thus-produced carbon black, naphthalene, pitch, and the like are usually used as a tire or a cement admixture. However, these carbon black, naphthalene, pitch, and the like have a relatively low added value and the range of use is limited.

Thus, various studies on a method of using coal tar produced in the steel industry by adding a higher value to the coal tar have been conducted. In addition, due to a trend that crude oil becomes heavy and an increase in an impurity content in crude oil worldwide, a production proportion of a residual oil produced from a petroleum refinery is also increased, which causes a large increase in the burden of a post-treatment process such as conventional desulfurization equipment. Meanwhile, referring to a worldwide energy demand forecast report suggested by Organization of Petroleum Exporting Countries, it is predicted that a demand for residual fuel is to be greatly decreased, while a demand for light oil is to be greatly increased. Accordingly, as a technology of converting a low-grade heavy oil into a high-quality heavy oil which may have no restrictions on an impurity content and guarantee a high yield, interest in a slurry phase hydrocracking reaction technology is greatly increasing.

Commercial catalysts which are applied to the slurry phase hydrocracking reaction may be largely classified into a heterogeneous iron oxide-based catalyst and a homogeneous organic metal dispersed catalyst, depending on a mixed form with a high-grade oil.

Among them, the heterogeneous iron oxide-based catalyst may be economically supplied, but a reaction temperature and a reaction temperature which are adjusted by an excessive hydrogen supply may be optimized under relatively severe conditions, resulting in high facility investment and operating costs.

In order to solve the problem, a catalyst including a transition metal and an organic compound ligand allowing a uniform distribution in a reactant has been devised. As an example, Non-patent Document 1 (Fuel, 185, 442-448 (2016)) discloses a catalyst having palladium supported on magnetite and a slurry phase hydrocracking reaction of a heavy oil utilizing the catalyst. However, the conventionally known catalyst as such has a problem of producing about 3 wt % of coke as an impurity, which is a relatively large amount.

Thus, a catalyst for a hydrocracking reaction for higher quality of a low-grade heavy oil and a catalyst precursor therefor are currently still in demand.

DISCLOSURE

Technical Problem

An object of the present invention is to provide a catalyst precursor for forming a molybdenum disulfide catalyst which may convert a low-grade heavy oil into a light oil by modification of the low-grade heavy oil.

Another object of the present invention is to provide a catalyst precursor which may increase selectivity to a low-boiling point liquid product and suppress production of a toluene-insoluble by-product, during a hydrocracking reaction for higher quality of a low-grade heavy oil.

Still another object of the present invention is to provide a hydrocracking reaction of a heavy oil, which may use the heavy oil as a raw material to prepare a low-boiling point liquid product with a high yield.

Technical Solution

In one general aspect, a catalyst precursor for a hydrocracking reaction represented by the following Chemical Formula 1 or Chemical Formula 2, which reacts with sulfur in a heavy oil to produce a molybdenum disulfide catalyst, is provided:

$$Mo(O)(O_2)_2L_2 \quad \text{[Chemical Formula 1]}$$ 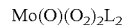

$$Mo(CO)_4L'_2 \quad \text{[Chemical Formula 2]}$$ 

wherein

L and L' are a ligand having a coordination number of 1, containing phosphorus as a central element.

In the catalyst precursor for a hydrocracking reaction according to an exemplary embodiment of the present invention, Chemical Formula 1 may be a compound represented by the following Chemical Formula 3:

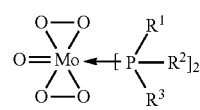

[Chemical Formula 3]

wherein $R^1$ to $R^3$ are independently of one another hydrogen, hydroxy, a halogen, $C_1$-$C_{30}$ alkyl, $C_3$-$C_{30}$ cycloalkyl, $C_6$-$C_{30}$ aryl, $C_1$-$C_{30}$ alkoxy, $C_3$-$C_{30}$ cycloalkyloxy, or $C_6$-$C_{30}$ aryloxy, and the alkyl, alkoxy, cycloalkyl, aryl, cycloalkyloxy, or aryloxy of $R^1$ to $R^3$ may be independently of one another further substituted by one or more substituents selected from a halogen, hydroxy, cyano, $C_1$-$C_{30}$ alkyl, $C_3$-$C_{30}$ cycloalkyl, and $C_6$-$C_{30}$ aryl.

In the catalyst precursor for a hydrocracking reaction according to an exemplary embodiment of the present invention, $R^1$ to $R^3$ of the compound represented by Chemical Formula 3 may be independently of one another hydroxy, $C_1$-$C_{10}$ alkoxy, $C_3$-$C_{12}$ cycloalkyloxy, or $C_6$-$C_{12}$ aryloxy, and the alkoxy, cycloalkyloxy, or aryloxy may be independently of one another further substituted by $C_1$-$C_{10}$ alkyl.

In the catalyst precursor for a hydrocracking reaction according to an exemplary embodiment of the present invention, $R^1$ to $R^3$ of the compound represented by Chemical Formula 3 may be independently of one another $C_1$-$C_{10}$ alkyl, $C_3$-$C_{12}$ cycloalkyl, $C_3$-$C_{12}$ cycloalkyl $C_1$-$C_{10}$ alkyl, or $C_1$-$C_{10}$ alkyl $C_3$-$C_{12}$ cycloalkyl.

In the catalyst precursor for a hydrocracking reaction according to an exemplary embodiment of the present invention, $R^1$ to $R^3$ of the compound represented by Chemical Formula 3 may be independently of one another $C_6$-$C_{12}$ aryl, $C_6$-$C_{12}$ aryl $C_1$-$C_{10}$ alkyl, or $C_1$-$C_{10}$ alkyl $C_6$-$C_{12}$ aryl.

In the catalyst precursor for a hydrocracking reaction according to an exemplary embodiment of the present invention, Chemical Formula 2 may be a compound represented by the following Chemical Formula 4:

[Chemical Formula 4]

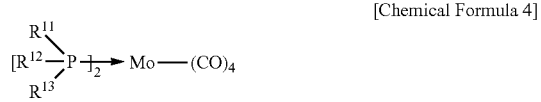

wherein $R^{11}$ to $R^{13}$ are independently of one another $C_1$-$C_{30}$ alkyl or $C_3$-$C_{30}$ cycloalkyl, and the alkyl or cycloalkyl of $R^{11}$ to $R^{13}$ may be independently of one another further substituted by one or more substituents selected from a halogen, hydroxy, cyano, $C_1$-$C_{30}$ alkyl, $C_3$-$C_{30}$ cycloalkyl, and $C_6$-$C_{30}$ aryl.

In the catalyst precursor for a hydrocracking reaction according to an exemplary embodiment of the present invention, $R^{11}$ to $R^{13}$ of the compound represented by Chemical Formula 4 may be independently of one another $C_1$-$C_{10}$ alkyl, $C_3$-$C_{12}$ cycloalkyl, $C_3$-$C_{12}$ cycloalkyl $C_1$-$C_{10}$ alkyl, or $C_1$-$C_{10}$ alkyl $C_3$-$C_{12}$ cycloalkyl.

In the catalyst precursor for a hydrocracking reaction according to an exemplary embodiment of the present invention, the molybdenum disulfide catalyst may be a molybdenum disulfide catalyst doped with phosphorus (P).

In the catalyst precursor for a hydrocracking reaction according to an exemplary embodiment of the present invention, the molybdenum disulfide catalyst doped with phosphorus may contain 0.001 to 1.0 mol of phosphorus (P) with respect to 1 mol of a molybdenum atom.

In the catalyst precursor for a hydrocracking reaction according to an exemplary embodiment of the present invention, the heavy oil may be a hydrocarbon having a hydrogen atom/carbon atom ratio (H/C) of 1 or less and containing 0.1 wt % or less of a sulfur atom, based on a total weight.

In another general aspect, a hydrocracking method of a heavy oil includes: mixing a sulfur-containing heavy oil and a catalyst precursor of Chemical Formula 1 or Chemical Formula 2 to produce a molybdenum disulfide catalyst.

In the hydrocracking method of a heavy oil according to an exemplary embodiment of the present invention, the catalyst precursor of Chemical Formula 1 may be a compound represented by Chemical Formula 3.

In the hydrocracking method of a heavy oil according to an exemplary embodiment of the present invention, the catalyst precursor of Chemical Formula 2 may be a compound represented by Chemical Formula 4.

In the hydrocracking method of a heavy oil according to an exemplary embodiment of the present invention, the molybdenum disulfide catalyst may be specifically a molybdenum disulfide catalyst doped with phosphorus (P), and more specifically, a molybdenum disulfide catalyst doped with 0.001 to 0.1 atom % of phosphorus (P), based on the total number of atoms in the catalyst.

In the hydrocracking method of a heavy oil according to an exemplary embodiment of the present invention, the catalyst precursor may be added at 0.01 to 5 wt %, based on a weight of the total reactants.

In the hydrocracking method of a heavy oil according to an exemplary embodiment of the present invention, the step may be performed at a temperature of 300 to 500° C. under a condition of 10 to 200 atm.

Advantageous Effects

The catalyst precursor according to the present invention reacts with sulfur in a heavy oil to produce a molybdenum disulfide catalyst doped with phosphorus (P), and cracking of a low-grade heavy oil may be effectively derived by the catalyst. Specifically, a yield of a low-boiling point liquid product having a high economical value among the products by heavy oil cracking may be increased, and a yield of a relatively uneconomical gaseous product or coke (toluene-insoluble component) as a by-product may be significantly decreased.

In addition, the catalyst precursor according to the present invention may be derived from molybdenum oxide ($MoO_3$) of which the unit cost is relatively cheap, and using the catalyst precursor makes it easy to supply and demand starting materials and has an economical advantage.

Thus, when a hydrocracking reaction through the catalyst precursor according to the present invention is applied, a high value-added liquid product (for example, a low-boiling point liquid product such as gasoline, kerosene, diesel, and naphtha) of which the boiling point corresponds to 30 to 524° C. may be provided with high selectivity from a low-grade residual oil discharged downstream of refinery, petrochemical, and steel industries or a high-boiling point heavy oil such as oil sand, pitch, and coal tar.

BEST MODE

Hereinafter, the catalyst precursor for a hydrocracking reaction according to the present invention will be described in detail. Here, technical terms and scientific terms used in the present specification have the general meaning understood by those skilled in the art to which the present invention pertains unless otherwise defined, and a description for the known function and configuration which may unnecessarily obscure the gist of the present invention will be omitted in the following description.

The term of the present specification, "conversion (%)" refers to a ratio of a total amount of a liquid product and a gaseous product based on a weight of an entire product. The entire product refers to a total weight of a gaseous product, a liquid product, a residue, and coke.

In addition, the term of the present specification, "a liquid yield" refers to a ratio of a total amount of a liquid product (for example, naphtha, middle distillate, and gas oil) based on the weight of the entire product, during a hydrocracking reaction of a heavy oil.

In addition, the term of the present specification, "coke" refers to a main by-product of a hydrocracking reaction which includes an organic matter formed of a large amount of carbon and some hydrogen, metals contained in the heavy oil, a catalyst component, and the like and is not cracked into a light oil anymore. Coke is a by-product which, when produced, lowers a yield of the hydrocracking reaction, and is deposited on a wall of a hydrocracker, a transfer pipe, or the like used in a unit process to cause a serious operational problem in the unit process.

In addition, the term of the present specification, "alkyl", "alkoxy", and a substituent including alkyl refer to a functional group derived from a linear or branched hydrocarbon. In addition, the alkoxy refers to *—O-alkyl.

In addition, the term of the present specification, "cycloalkyl" refers to a functional group derived from a completely saturated or partially unsaturated hydrocarbon ring having 3 to 9 carbon atoms and includes those to which aryl or heteroaryl is fused; and "heterocycloalkyl" refers to a functional group derived from a monocyclic or polycyclic non-aromatic ring containing 3 to 9 ring atoms containing one or more selected from B, N, O, S, Se, P(=O)—, —C(=O)—, Si, P, and the like. In addition, the cycloalkyloxy refers to *—O-cycloalkyl.

In addition, the term of the present specification, "aryl" refers to a functional group derived from aromatic hydrocarbon by removal of one hydrogen, and includes a monocyclic or fused ring system containing suitably 4 to 9, preferably 5 or 6 ring atoms in each ring and includes even a form in which a plurality of aryls is linked by a single bond. As an example, phenyl, naphthyl, biphenyl, terphenyl, anthryl, indenyl, fluorenyl, phenanthryl, triphenylenyl, pyrenyl, perylenyl, chrysenyl, naphthacenyl, fluoranthenyl, and the like are included, but the present invention is not limited thereto. In addition, "aryloxy" refers to *—O-aryl.

In addition, the term of the present specification, "halogen" refers to fluorine (F), chlorine (Cl), bromine (Br), or iodine (I) atom.

As a result of repeating a study of a catalyst for a hydrocracking reaction for higher quality of a low-grade heavy oil, the present inventors devised a catalyst precursor for a hydrocracking reaction which dissociates and bonds to a sulfur (S) element contained in the low-grade heavy oil to be easily converted into a molybdenum disulfide catalyst, thereby effectively deriving heavy oil cracking.

Specifically, the catalyst precursor for a hydrocracking reaction according to the present invention is a transition metal complex using molybdenum oxide ($MoO_3$) or molybdenum hexacarbonyl ($Mo(CO)_6$) as a starting material, and is applied to a hydrocracking reaction of a heavy oil such as reduced-pressure residual oil or coal tar to realize excellent catalyst activity and preventing activation deterioration of the produced molybdenum disulfide catalyst.

Specifically, the catalyst precursor for a hydrocracking reaction according to the present invention may be applied to a heavy oil hydrocracking reaction, thereby preparing a high value-added liquid product (for example, a low-boiling point liquid product such as gasoline, kerosene, diesel, and naphtha) of which the boiling point corresponds to 30 to 380° C. with high selectivity from a reduced-pressure residual oil (a low-grade residual oil) discharged downstream of refinery, petrochemical, and steel industries and the like or a high-boiling point heavy oil such as oil sand, pitch, and coal tar.

Specifically, the catalyst precursor for a hydrocracking reaction according to the present invention is provided as an organic metal complex form including oxodiperoxy molybdenum (Mo=O($O_2$)$_2$) and the like, using molybdenum oxide ($MoO_3$) of which the unit cost is relatively cheap, and thus, is commercially very advantageous.

Hereinafter, the catalyst precursor for a hydrocracking reaction of the present invention will be described.

The catalyst precursor for a hydrocracking reaction according to the present invention may be a compound represented by the following Chemical Formula 1 or Chemical Formula 2, which reacts with sulfur in a heavy oil to produce a molybdenum disulfide catalyst.

  [Chemical Formula 1]

  [Chemical Formula 2]

wherein

L and L' are a ligand having a coordination number of 1, containing phosphorus as a central element.

When the compound represented by Chemical Formula 1 or Chemical Formula 2 is mixed with a heavy oil, a reaction with a sulfur (S) element contained in the heavy oil occurs to produce molybdenum disulfide ($MoS_2$). The thus-produced molybdenum disulfide gathers and grows into nano-sized particles, which acts as a catalyst for a hydrocracking reaction of a heavy oil.

Specifically, in the hydrocracking reaction process, in an organic metal complex including the catalyst precursor described above, a reaction of dissociating and bonding to a sulfur (S) element present in the heavy oil simultaneously with a cracking reaction of molybdenum and a ligand containing a phosphorus (P) element is performed, thereby performing conversion into the molybdenum disulfide catalyst. Thus, phosphorus produced in the cracking reaction is mixed with molybdenum disulfide, resulting in production of a molybdenum disulfide catalyst doped with phosphorus.

As such, when the molybdenum disulfide catalyst doped with phosphorus is used to perform a heavy oil hydrocracking reaction, production of coke which is a by-product may be surprisingly decreased, as compared with the case of using only the molybdenum disulfide catalyst.

As an example, the molybdenum disulfide catalyst may be nano-sized particles of 3 to 50 nm, specifically 5 to 20 nm.

As an example, the molybdenum disulfide catalyst may be acicular particles, and when having this shape, the hydrocracking reaction may be efficiently performed with a large surface area.

As an example, when the molybdenum disulfide catalyst doped with 0.06 atom % of phosphorus (P) is used, production of coke which is a by-product may be decreased by specifically 70% or more, and more specifically 75% or more, as compared with the case of using a molybdenum disulfide catalyst which is not doped with phosphorus.

In terms of commercial advantage, since production of coke is greatly limited, a high yield of a low-boiling point liquid product is implemented, and also a more rapid hydrocracking reaction of a heavy oil may be performed, the catalyst precursor may be represented by the following Chemical Formula 3:

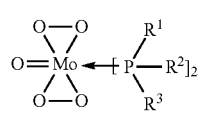  [Chemical Formula 3]

wherein $R^1$ to $R^3$ are independently of one another hydrogen, hydroxy, a halogen, $C_1$-$C_{30}$ alkyl, $C_3$-$C_{30}$ cycloalkyl, $C_6$-$C_{30}$ aryl, $C_1$-$C_{30}$ alkoxy, $C_3$-$C_{30}$ cycloalkyloxy, or $C_6$-$C_{30}$ aryloxy, and the alkyl, alkoxy, cycloalkyl, aryl, cycloalkyloxy, or aryloxy of $R^1$ to $R^3$ may be independently of one another further substituted by one or more substituents selected from a halogen, hydroxy, cyano, $C_1$-$C_{30}$ alkyl, $C_3$-$C_{30}$ cycloalkyl, and $C_6$-$C_{30}$ aryl.

In Chemical Formula 3, $R^1$ to $R^3$ may be independently of one another hydroxy, $C_1$-$C_{10}$ alkoxy, $C_3$-$C_{12}$ cycloalkyloxy, or $C_6$-$C_{12}$ aryloxy, and the alkoxy, cycloalkyloxy, or aryloxy may be independently of one another further substituted by $C_1$-$C_{10}$ alkyl. Here, when $R^1$ to $R^3$ have a substituent which is further substituted by alkyl, the number of alkyl substituent may be one or two or more.

In Chemical Formula 3, $R^1$ to $R^3$ may be independently of one another $C_7$-$C_{10}$ alkoxy, $C_3$-$C_{12}$ cycloalkyloxy, $C_1$-$C_5$ alkyl $C_3$-$C_{12}$ cycloalkyloxy, $C_6$-$C_{12}$ aryloxy $C_1$-$C_5$ alkyl $C_6$-$C_{12}$ aryloxy.

In Chemical Formula 3, $R^1$ to $R^3$ may be independently of one another $C_1$-$C_{10}$ alkyl, $C_3$-$C_{12}$ cycloalkyl, $C_3$-$C_{12}$ cycloalkyl $C_1$-$C_{10}$ alkyl, or $C_1$-$C_{10}$ alkyl $C_3$-$C_{12}$ cycloalkyl.

In Chemical Formula 3, $R^1$ to $R^3$ may be independently of one another $C_7$-$C_{10}$ alkyl, $C_3$-$C_{12}$ cycloalkyl, $C_3$-$C_{12}$ cycloalkyl $C_7$-$C_{10}$ alkyl, or $C_1$-$C_5$ alkyl $C_3$-$C_{12}$ cycloalkyl.

In Chemical Formula 3, $R^1$ to $R^3$ may be independently of one another $C_6$-$C_{12}$ aryl, $C_6$-$C_{12}$ aryl $C_7$-$C_{10}$ alkyl, or $C_1$-$C_5$ alkyl $C_6$-$C_{12}$ aryl.

In Chemical Formula 3, $R^1$ to $R^3$ may be independently of one another $C_6$-$C_{12}$ alkyl, $C_6$-$C_{12}$ aryl $C_7$-$C_{10}$ alkyl, or $C_1$-$C_5$ alkyl $C_6$-$C_{12}$ aryl.

The catalyst precursor in an organic metal complex form including oxodiperoxy molybdenum described above also has a high yield of a low-boiling point liquid product having a high economical value among the products by heavy oil cracking.

Besides, in terms of implementing a high yield of a low-boiling point liquid product, the catalyst precursor may be represented by the following Chemical Formula 4:

[Chemical Formula 4]

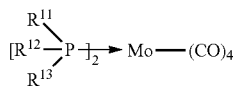

wherein $R^{11}$ to $R^{13}$ are independently of one another $C_1$-$C_{30}$ alkyl or $C_3$-$C_{30}$ cycloalkyl, and the alkyl or cycloalkyl of $R^{11}$ to $R^{13}$ may be independently of one another further substituted by one or more substituents selected from a halogen, hydroxy, cyano, $C_1$-$C_{30}$ alkyl, $C_3$-$C_{30}$ cycloalkyl, and $C_6$-$C_{30}$ aryl.

In Chemical Formula 4, $R^{11}$ to $R^{13}$ may be independently of one another $C_1$-$C_{10}$ alkyl, $C_3$-$C_{12}$ cycloalkyl, $C_3$-$C_{12}$ cycloalkyl $C_1$-$C_{10}$ alkyl, or $C_1$-$C_{10}$ alkyl $C_3$-$C_{12}$ cycloalkyl.

In Chemical Formula 4, $R^{11}$ to $R^{13}$ may be independently of one another $C_8$-$C_{10}$ alkyl, $C_3$-$C_{12}$ cycloalkyl, $C_3$-$C_{12}$ cycloalkyl $C_8$-$C_{10}$ alkyl, or $C_1$-$C_5$ alkyl $C_3$-$C_{12}$ cycloalkyl.

When a heavy oil hydrocracking reaction is performed using the catalyst precursor in an organic metal complex form, production of coke which is a by-product may be effectively suppressed, while a ratio of a liquid product is high. In addition, since the molybdenum disulfide catalyst doped with phosphorus produced in a cracking reaction of the catalyst precursor may suppress an activity decrease of the catalyst described above, excellent catalytic activity may be implemented even during a long-term use.

Hereinafter, a hydrocracking reaction of a heavy oil using the molybdenum disulfide catalyst prepared by the catalyst precursor for a hydrocracking reaction of the present invention will be described.

Specifically, the hydrocracking method of a heavy oil according to the present invention may include mixing a sulfur-containing heavy oil and the catalyst precursor of the following Chemical Formula 1 or Chemical Formula 2 to produce the molybdenum disulfide catalyst. That is, in the hydrocracking method according to the present invention, preparation of the molybdenum disulfide catalyst is performed in a reaction system, and is produced by a reaction with the heavy oil which is a reactant. When the thus-produced molybdenum disulfide catalyst is used to perform the hydrocracking reaction of a heavy oil, a liquid product such as naphtha to be desired in the present invention may be formed at a high ratio, while production of a by-product such as coke is minimized.

The molybdenum disulfide catalyst may be a molybdenum disulfide catalyst doped with phosphorus (P).

As an example, the molybdenum disulfide catalyst doped with phosphorus (P) may contain 0.001 to 1.0 mol of a phosphorus (P) atom, specifically 0.01 to 0.5 mol of the phosphorus (P) atom, more specifically 0.03 to 0.3 mol of the phosphorus (P) atom, and most specifically 0.05 to 0.1 mol of the phosphorus (P) atom with respect to 1 mol of a molybdenum (Mo) atom.

As an example, the molybdenum disulfide catalyst doped with phosphorus (P) may contain 0.001 to 0.1 atom %, specifically 0.005 to 0.1 atom %, and more specifically 0.01 to 0.08 atom % of a phosphorus atom, based on the total number of atoms in the catalyst.

Within the range described above, the molybdenum disulfide catalyst doped with phosphorus may significantly lower a coke production ratio due to phosphorus doping, while preventing an activity decrease of the molybdenum disulfide catalyst due to an excessive content of phosphorus.

In addition, in the hydrocracking method of a heavy oil according to the present invention, the effect corresponds to a result conflicting with the result of an embodiment in which a phosphorus (P)-based compound is separately mixed within the range described above.

In the above step, the catalyst precursor may be one or a mixture of two or more selected from the embodiments described above.

As an example, when the catalyst precursor is selected from the compound represented by Chemical Formula 3, production of coke is greatly limited, a high yield of a low-boiling point liquid product is implemented while a yield of a gaseous product having a relatively low value may be significantly lowered, and a high-quality light oil may be provided through hydrocracking of a heavy oil by a very economical method.

As an example, when the catalyst precursor is selected from the compound represented by Chemical Formula 4, a high yield of a low-boiling point liquid product may be implemented. Here, in the case of the compound represented by Chemical Formula 4, a significant effect may be implemented in coke production as compared with a phosphorus-based compound containing an aryl group.

In the step, the catalyst precursor may be mixed with the heavy oil at an appropriate use amount depending on the purpose.

As an example, the catalyst precursor may be included at 0.01 to 5 wt %, specifically 0.01 to 2 wt %, and more specifically 0.02 to 1 wt %, based on the total weight of the reactant. Here, the reactant includes a residual amount of a heavy oil.

Within the range described above, the molybdenum disulfide catalyst doped with phosphorus may prevent a problem that a ligand leaves due to mixing of a large amount of the catalyst precursor to be contained as an impurity, while representing sufficient catalytic activity.

The heavy oil is not limited as long as it contains a sulfur (S) element.

As an example, the heavy oil may be a hydrocarbon compound to which a large amount of carbon is added relative to hydrogen, having a hydrogen atom/carbon atom ratio (H/C) of 1 or less.

As an example, the heavy oil may be a hydrocarbon compound having a hydrogen atom/carbon atom ratio (H/C) of 1 or less and containing 0.1 wt % or more of a sulfur atom, specifically a hydrocarbon compound containing 0.1 to 5 wt % of the sulfur atom, and more specifically a hydrocarbon compound containing 0.5 to 5 wt % of the sulfur atom, based on a total weight.

As an example, the heavy oil may be selected from a reduced-pressure residual oil (low-grade residual oil) or a high-boiling point heavy oil such as oil sand, pitch, and coal tar, and the like and have a hydrogen atom/carbon atom ratio (H/C) of 1 or less.

The step may be performed at a temperature condition of 300 to 500° C. and under an atmospheric pressure condition of 10 to 200 atm, in terms of preventing a production cost increase and catalyst deformation due to a too severe environment, while efficiently forming the molybdenum disulfide catalyst by a reaction of a molybdenum complex and sulfur.

According to the hydrocracking reaction of a heavy oil using the catalyst precursor according to the present invention, a high value-added liquid product (for example, a low-boiling point liquid product such as gasoline, kerosene, diesel, and naphtha) of which the boiling point corresponds to 30 to 380° C. may be prepared with high selectivity from a reduced-pressure residual oil (a low-grade residual oil) discharged downstream of refinery, petrochemical, and steel industries, and the like, or a high-boiling point heavy oil such as oil sand, pitch, and coal tar. In addition, a yield of a relatively uneconomical gaseous product or coke (toluene-insoluble component) which is a by-product may be significantly lowered.

Hereinafter, the present invention will be described in detail by the following Examples. The following Examples described below are only to assist in the understanding of the present invention, and the present invention is not limited to the following Examples.

(Evaluation Method)

Raw Material Property Analysis

The elemental components of a reduced-pressure residual oil and each content thereof were confirmed by elemental analysis (model name: Thermo Scientific Flash 2000, sensor: Thermal Conductivity Detector), X-ray fluorescence analysis (model name: Thermo/ARL QUANT'X), and inductively coupled plasma-atomic emission spectrometry (ICP-AES; model name: Thermo Fisher Scientific iCAP 6500Duo).

In addition, the structures of the catalyst precursors of the following Examples and the Comparative Examples were analyzed by NMR, IR, and elemental analysis, and the chemical composition and structure of a molybdenum disulfide catalyst in coke produced after a hydrocracking reaction of a vacuum residual oil by the precursor mentioned in the present invention were confirmed by X-ray photoelectron spectroscopy (XPS) and X-ray diffraction (XRD).

In addition, SARA (saturates, aromatics, resins, and asphaltenes) content analysis of the products produced by the hydrocracking reaction of the following Examples and the Comparative Examples were confirmed by SARA analyzer (model name: Latroscan Mk6s), and a boiling point distribution was confirmed by the method of ASTM D7169 (GC-SIMDIS).

EXAMPLE 1

Hydrocracking reaction using $Mo(O)(O_2)_2(PPh_3)_2$

Step 1. To a 100 mL Schlenk tube substituted with argon, 1 g (6.94 mmol) of $MoO_3$ and 2 ml of hydrogen peroxide ($H_2O_2$, 27%) were added, and stirring was performed at 65° C. for about 45 minutes. When the reactant became a yellow transparent solution, the Schlenk tube was soaked in ice water to lower the temperature of the reactant to 0° C. When the temperature of the reactant was lowered, triphenylphosphine (4 g, 15.28 mmol) was dissolved in 10 ml of tetrahydrofuran (THF) and the solution was slowly added dropwise to the Schlenk tube. After complete addition dropwise, the reaction was performed at 0° C. for 1 hour and at room temperature (23° C.) for 1 hour. After the reaction, a supernatant was removed, precipitates were washed once with distilled water and three times each with ethanol and ethyl ether and dried, thereby obtaining a catalyst precursor for a hydrocracking reaction ($Mo(O)(O_2)_2(PPh_3)_2$) (yield: 86%).

$^1$H-NMR ($CD_2Cl_2$, ppm): 7.72~7.45 (m 15H)

$^{13}$C-NMR ($CD_2Cl_2$, Ppm): 133.24, 132.22, 131.98, 131.44 (Phenyl)

$^{31}$P-NMR (DMSO, ppm): 25.46

FT-IR ($cm^{-1}$): 952, 864, 662, 583

Step 2. The catalyst precursor for a hydrocracking reaction ($Mo(O)(O_2)_2(PPh_3)_2$) was used to perform a hydrocracking reaction of reduced-pressure residual oil (VR) under the following conditions. Here, a reduced-pressure residual oil available from Hyundai Oilbank was used as the reduced-pressure residual oil, and the elemental component thereof and each content thereof were analyzed and shown in the following Table 1.

Specifically, to a high-temperature high-pressure reactor having a capacity of 100 ml, 20 g of a reduced-pressure residual oil was added, the catalyst precursor prepared above ($Mo(O)(O_2)_2(PPh_3)_2$) was added at 250 wppm (based on a Mo element, 0.025 wt % based on the reduced-pressure residual oil), hydrogen filling and purging were repeated three or more times in the reactor, and then the reactant was prepared so that hydrogen is 80 bar at 80° C. The temperature of the prepared reactant was raised to 430° C., and then the hydrocracking reaction was performed for 1 hour simultaneously with stirring (1500 rpm).

When the reaction was finished, the reactant was rapidly cooled to a room temperature state by a cooling coil, the gaseous product was captured in a tedlar bag and analyzed by gas chromatography equipped with TCD and FID, the liquid product and coke were separated depending on a solubility difference in toluene and quantified, and a viscosity distribution of the separated liquid product was analyzed according to the method of ASTM D7169 (GC-SIMDIS).

In addition, the components of the hydrocracked reduced-pressure residual oil and the components obtained after the hydrocracking reaction were subjected to fractional distillation and are shown in Table 1. Table 2 shows the results of analyzing coke components produced after the hydrocracking reaction of a vacuum residual oil using a $(Mo(O)(O_2)_2(PPh_3)_2)$ precursor by XPS.

In addition, the analysis results of the products produced after the hydrocracking reaction of the vacuum residual oil in each of Examples 1 to 5 and Comparative Examples 1 and 2 are shown in the following Table 3.

TABLE 1

| Classification | | Elemental component and content of reduced-pressure residual oil |
|---|---|---|
| Elemental analysis | C | 84 wt % |
| | H | 10.71 wt % |
| | S | 4.84 wt % |
| | N | 0.14 wt % |
| | Others | 0.31 wt % |
| | Total | 100 wt % |
| | H/C mole fraction | 1.45 |
| Metal component analysis | Ni | 36.4 ppm |
| | V | 151 ppm |
| | Fe | 38.3 ppm |
| | Ca | 25 ppm |
| | Si | 198 ppm |
| SARA analysis | Saturate | 4 wt % |
| | Aromatic | 61 wt % |
| | Resin | 18 wt % |
| | Asphaltene | 17 wt % |
| | Total | 100 wt % |
| Fractional distillation | Room temperature to 150° C. | 0.05 wt % |
| | 150 to 220° C. | 0.01 wt % |
| | 220 to 343° C. | 4.59 wt % |
| | 343 to 450° C. | 45.82 wt % |
| | 450 to 550° C. | 34.06 wt % |
| | 550 to 900° C. | 2.01 wt % |
| | Residual oil | 3.46 wt % |
| | Total | 100 wt % |

TABLE 2

| Component | Content (atom %) |
|---|---|
| C | 88.88 |
| O | 6.61 |
| P | 0.06 |
| S | 2.92 |
| Mo | 1.53 |

As shown in the above Table 2, it was confirmed that the catalyst precursor for a hydrocracking reaction according to the present invention $(Mo(O)(O_2)_2(PPh_3)_2)$ may produce a molybdenum disulfide catalyst $(MoS_2)$ by a reaction with sulfur in the heavy oil. Specifically, it was confirmed that the produced molybdenum disulfide catalyst was doped with 0.06 atom % of phosphorus (P).

EXAMPLE 2

Hydrocracking reaction using $Mo(O)(O_2)_2(P(OEt)_3)_2$

Step 1. A catalyst precursor for a hydrocracking reaction $(Mo(O)(O_2)_2(P(OEt)_3)_2)$ was prepared under the same reaction conditions as Step 1 of Example 1, by using triethylphosphite instead of triphenylphosphine, as a ligand having a coordination number of 1 in Step 1 of Example 1.

$^1$H-NMR (DMSO-$d_6$, ppm): 1.23 (m, 18H), 3.98 (m, 12H)
$^{13}$C-NMR (DMSO-$d_6$, ppm): 15.90, 15.96, 63.01, 63.07
FT-IR (cm$^{-1}$): 942, 983, 911, 803

Step 2. A hydrocracking reaction was performed under the same reaction condition as Step 2 of Example 1, by using the catalyst precursor for a hydrocracking reaction $(Mo(O)(O_2)_2(P(OEt)_3)_2)$.

In addition, each product was analyzed according to the evaluation method of each step performed in Example 1, and the analysis results of the product produced after the hydrocracking reaction are shown in the following Table 3.

EXAMPLE 3

Hydrocracking Reaction Using $Mo(O)(O_2)_2(PCy_3)_2$

Step 1. A catalyst precursor for a hydrocracking reaction $(Mo(O)(O_2)_2(PCy_3)_2)$ was prepared under the same reaction conditions as Step 1 of Example 1, by using tricyclohexanephosphine instead of triphenylphosphine, as a ligand having a coordination number of 1 in Step 1 of Example 1.

$^1$H-NMR (CD$_2$Cl$_2$, ppm): 1.99 (m, 9H), 1.81 (d, 6H), 1.68 (s, 3H), 1.51 (t, 6H), 1.26 (s, 9H)
$^{13}$C-NMR (CD$_2$Cl$_2$, ppm): 217.19 (Mo—CO), 37.72 (P—C—), 30.43 (—CH$_2$—)

Step 2. A hydrocracking reaction was performed under the same reaction condition as Step 2 of Example 1, by using the catalyst precursor for a hydrocracking reaction $(Mo(O)(O_2)_2(PCy_3)_2)$.

In addition, each product was analyzed according to the evaluation method of each step performed in Example 1, and the analysis results of the product produced after the hydrocracking reaction are shown in the following Table 3.

EXAMPLE 4

Hydrocracking Reaction Using $Mo(C_0)_4(TOP)_2$

Step 1. To a 100 mL Schlenk tube substituted with argon, 1 g (3.8 mmol) of $Mo(CO)_6$ and trioctylphosphine were dissolved in 10 ml of diethylene glycol dimethyl ether, and the reaction was performed at 150° C. for 20 hours. After the reaction, a supernatant was removed, and precipitates were washed once with distilled water and three times each with ethanol and ethyl ether and dried, thereby preparing a catalyst precursor for a hydrocracking reaction $(Mo(CO)_4(TOP)_2)$.

$^1$H-NMR (CDCl$_3$, ppm): 1.64 (m 6H), 1.40 (m, 36H), 0.88 (t, 9H)
$^{13}$C-NMR (CDCl$_3$, ppm): 212.79 (M-CO), 31.93, 31.29, 29.37, 27.69, 26.10, 23.94, 22.78 (—CH$_2$—), 14.21 (—CH$_2$CH$_3$)
FT-IR: 2922.4, 2853.3 (Octyl), 1877.4 cm$^{-1}$ (Mo—CO)

Step 2. A hydrocracking reaction was performed under the same reaction condition as Step 2 of Example 1, by using the catalyst precursor for a hydrocracking reaction $(Mo(CO)_4(TOP)_2)$.

In addition, each product was analyzed according to the evaluation method of each step performed in Example 1, and the analysis results of the product produced after the hydrocracking reaction are shown in the following Table 3.

EXAMPLE 5

Hydrocracking Reaction Using $Mo(CO)_4(TCyHP)_2$

Step 1. A catalyst precursor for a hydrocracking reaction $(Mo(CO)_4(TCyHP)_2)$ was prepared under the same reaction conditions as Step 1 of Example 4, by using tricyclohexanephosphine instead of triphenylphosphine, as a ligand having a coordination number of 1 in Step 1 of Example 4.

$^1$H-NMR (CD$_2$Cl$_2$, ppm) 2.04 (m, 12H), 1.87 (m, 6H), 1.68 (s, 3H), 1.48 (m, 3H), 1.26 (s, 9H)

$^{13}$C-NMR (CD$_2$Cl$_2$, ppm): 217.19 (Mo—CO), 37.72 (P—C—), 30.43, 28.36, 27.016

Step 2. A hydrocracking reaction was performed under the same reaction condition as Step 2 of Example 1, by using the catalyst precursor for a hydrocracking reaction (Mo(CO)$_4$(TCyHP)$_2$).

In addition, each product was analyzed according to the evaluation method of each step performed in Example 1, and the analysis results of the product produced after the hydrocracking reaction are shown in the following Table 3.

COMPARATIVE EXAMPLE 1

Hydrocracking Reaction Using Molybdenum 2-ethylenehexanoate

Step 1. According to the method of the patent KR 1396181, 30.0 g of a molybdic acid (Aldrich, MoO$_3$≥85.0%) and 102.2 g of 2-ethylhexanoic acid (Aldrich, 99%) were mixed together in a 300 ml flask and then heated at 200° C. for 1 hour while being purged with N$_2$ at 100 ml/min with stirring. Purging was replaced with a mixture of 20% H$_2$ and 80% N$_2$ and maintained at 200° C. for 12 hours. The reaction yielded molybdenum 2-ethylhexanoate having 14.7 wt % of Mo.

$^1$H-NMR (CDCl$_3$, ppm): 2.256 (m, 1H), 1.620 (m, 4H), 1.283 (m, 4H), 0.910 (m, 6H)

$^{13}$C-NMR (CDCl$_3$, ppm): 183.38, 47.31, 31.58, 29.66, 25.28, 22.74, 13.90, 11.74

Step 2. A hydrocracking reaction was performed under the same reaction condition as Step 2 of Example 1, by using the molybdenum 2-ethylhexanoate.

In addition, each product was analyzed according to the evaluation method of each step performed in Example 1, and the analysis results of the product produced after the hydrocracking reaction are shown in the following Table 3.

COMPARATIVE EXAMPLE 2

To the molybdenum 2-ethylhexanoate precursor synthesized in Step 1 of Comparative Example 1, 1 equivalent of triphenylphosphine (Pph3)$_3$) was added, and a hydrocracking reaction was performed under the same reaction conditions as Step 2 of Comparative Example 1.

In addition, each product was analyzed according to the evaluation method of each step performed in Example 1, and the analysis results of the product produced after the hydrocracking reaction are shown in the following Table 3.

TABLE 3

| Classification | Example 1 | Example 2 | Example 3 | Example 4 | Example 5 | Comparative Example 1 | Comparative Example 2 |
|---|---|---|---|---|---|---|---|
| ① Gaseous product (%) | 5.22 | 5.34 | 5.73 | 5.50 | 5.30 | 6.70 | 5.44 |
| ② Liquid product (%) | | | | | | | |
| Naphtha (IPB-177° C.) | 14.44 | 15.04 | 10.79 | 15.77 | 14.71 | 4.50 | 7.21 |
| M.D.$^a$ (177-343° C.) | 21.42 | 23.94 | 24.42 | 24.10 | 23.57 | 27.00 | 19.56 |
| Gas oil (343-524° C.) | 37.62 | 31.88 | 35.28 | 38.87 | 31.50 | 34.40 | 36.77 |
| ③ Residue (%) | | | | | | | |
| (524° C.-FBP) | 20.55 | 23.00 | 22.83 | 14.80 | 23.97 | 24.10 | 28.90 |
| ④ Coke (%)$^d$ | 0.75 | 0.80 | 0.95 | 0.96 | 0.95 | 3.30 | 2.12 |
| Liquid yield (%)$^b$ | 73.48 | 70.86 | 70.49 | 78.74 | 69.78 | 65.90 | 63.54 |
| Conversion (%)$^c$ | 78.70 | 76.2 | 76.22 | 84.24 | 75.08 | 72.60 | 71.10 |

$^a$M.D.: Middle distillate
$^b$100%-①-③-④
$^c$100%-③
$^d$Toluene-insoluble component (%)

As shown in Table 3, it was confirmed that when the molybdenum disulfide catalyst prepared from the catalyst precursor according to the present invention was used, a content of a liquid product was high and a production amount of coke (toluene-insoluble component) which is a by-product was significantly low.

Specifically, the molybdenum disulfide catalyst prepared from the catalyst precursor according to the present invention may implement 10 wt % or more of selectivity to the low-boiling point liquid product, of course, and provide a high-quality light oil (such as gasoline and diesel) having 1 wt % or less of a toluene-insoluble component (coke) which is a by-product. Besides, the above-described effect is expected as a synergistic effect generated by doping the molybdenum disulfide catalyst prepared from the catalyst precursor according to the present invention with phosphorus (P). That is, it is noted that the above-described effect showed a different aspect of the effect from the case of simply separately adding a compound containing phosphorus (P) to the molybdenum disulfide catalyst later.

Specifically, when the catalyst precursor including oxodiperoxy molybdenum derived from molybdenum oxide according to the present invention is used, it is also commercially useful in that the molybdenum disulfide catalyst may be provided under the very economical conditions.

As described above, though the exemplary embodiments of the present invention have been described in detail, a person skilled in the art may make various variations of the present invention without departing from the spirit and the scope of the present invention, as defined in the claims which follow. Accordingly, any modification of the following Examples of the present invention may not depart from the technique of the present invention.

The invention claimed is:

1. A catalyst precursor for a hydrocracking reaction represented by the following Chemical Formula 1, which reacts with sulfur in a heavy oil to produce a molybdenum disulfide catalyst:

[Chemical Formula 1]

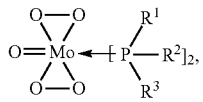

wherein
R$^1$ to R$^3$ are independently of one another hydrogen, hydroxy, halogen, C$_1$-C$_{30}$ alkyl, C$_3$-C$_{30}$ cycloalkyl, C$_6$-C$_{30}$ aryl, C$_1$-C$_{30}$ alkoxy, C$_3$-C$_{30}$ cycloalkyloxy, or C$_6$-C$_{30}$ aryloxy, and optionally the alkyl, alkoxy, cycloalkyl, aryl, cycloalkyloxy, or aryloxy of R$^1$ to R$^3$ is independently of one another further substituted by one or more substituents selected from halogen, hydroxy, cyano, C$_1$-C$_{30}$ alkyl, C$_3$-C$_{30}$ cycloalkyl, and C$_6$-C$_{30}$ aryl.

2. The catalyst precursor for a hydrocracking reaction of claim 1, wherein R$^1$ to R$^3$ of Chemical Formula 1 are independently of one another hydroxy, C$_1$-C$_{10}$ alkoxy, C$_3$-C$_{12}$ cycloalkyloxy, or C$_6$-C$_{12}$ aryloxy.

3. The catalyst precursor for a hydrocracking reaction of claim 1, wherein R$^1$ to R$^3$ of Chemical Formula 1 are independently of one another C$_1$-C$_{10}$ alkyl, C$_3$-C$_{12}$ cycloalkyl, C$_3$-C$_{12}$ cycloalkyl C$_1$-C$_{10}$ alkyl, or C$_1$-C$_{10}$ alkyl C$_3$-C$_{12}$ cycloalkyl.

4. The catalyst precursor for a hydrocracking reaction of claim 1, wherein R$^1$ to R$^3$ of Chemical Formula 1 are independently of one another C$_6$-C$_{12}$ aryl, C$_6$-C$_{12}$ aryl C$_1$-C$_{10}$ alkyl, or C$_1$-C$_{10}$ alkyl C$_6$-C$_{12}$ aryl.

5. A hydrocracking method of a heavy oil, the method comprising:
    mixing a sulfur-containing heavy oil and a catalyst precursor of the following Chemical Formula 1 to produce a molybdenum disulfide catalyst, and performing a hydrocracking reaction of the heavy oil by using the molybdenum disulfide catalyst:

[Chemical Formula 1]

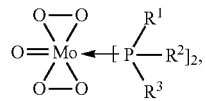

wherein
R$^1$ to R$^3$ are independently of one another hydrogen, hydroxy, halogen, C$_1$-C$_{30}$ alkyl, C$_3$-C$_{30}$ cycloalkyl, C$_6$-C$_{30}$ aryl, C$_1$-C$_{30}$ alkoxy, C$_3$-C$_{30}$ cycloalkyloxy, or C$_6$-C$_{30}$ aryloxy, and optionally the alkyl, alkoxy, cycloalkyl, aryl, cycloalkyloxy, or aryloxy of R$^1$ to R$^3$ is independently of one another further substituted by one or more substituents selected from halogen, hydroxy, cyano, C$_1$-C$_{30}$ alkyl, C$_3$-C$_{30}$ cycloalkyl, and C$_6$-C$_{30}$ aryl.

6. The hydrocracking method of a heavy oil of claim 5, wherein the molybdenum disulfide catalyst is a molybdenum disulfide catalyst doped with phosphorus (P) containing 0.001 to 0.1 atom % of a phosphorus atom, based on a total number of atoms in the molybdenum disulfide catalyst.

7. The hydrocracking method of a heavy oil of claim 5, wherein the catalyst precursor is added at 0.01 to 5 wt %, based on a total weight of a reactant.

8. The hydrocracking method of a heavy oil of claim 5, wherein the hydrocracking reaction is performed at a temperature of 300 to 500° C. under a 10 to 200 atm condition.

9. The hydrocracking method of a heavy oil of claim 5, wherein the molybdenum disulfide catalyst is doped with phosphorus (P).

10. The hydrocracking method of a heavy oil of claim 9, wherein the molybdenum disulfide catalyst doped with phosphorus contains 0.001 to 1.0 mol of phosphorus (P) with respect to 1 mol of a molybdenum atom.

11. The hydrocracking method of a heavy oil of claim 5, wherein the heavy oil is a hydrocarbon having a hydrogen atom/carbon atom ratio (H/C) of 1 or less and containing 0.1 wt % or more of a sulfur atom, based on a total weight.

* * * * *